United States Patent [19]

Bryan-Brown et al.

[11] Patent Number: 5,796,459
[45] Date of Patent: Aug. 18, 1998

[54] BISTABLE NEMATIC LIQUID CRYSTAL DEVICE WITH BIGRATING ALIGNMENT LAYERS AND TWIST

[75] Inventors: Guy P. Bryan-Brown; Damien G. McDonnell, both of Malvern; Michael J. Towler, Oxford, all of United Kingdom; Martin S. Bancroft, Columbus, Ohio

[73] Assignee: The Secretary of State for Defence in Her Britannic Majesty's Government of the United Kingdom of Great Britain and Northern Ireland, Hants, United Kingdom

[21] Appl. No.: 693,089

[22] PCT Filed: Jan. 30, 1995

[86] PCT No.: PCT/GB95/00179

§ 371 Date: Sep. 20, 1996

§ 102(e) Date: Sep. 20, 1996

[87] PCT Pub. No.: WO95/22077

PCT Pub. Date: Aug. 17, 1995

[30] Foreign Application Priority Data

Feb. 9, 1994 [GB] United Kingdom ............ 9402513

[51] Int. Cl.$^6$ .................. G02F 1/1337; G02F 1/13
[52] U.S. Cl. .................. 349/132; 349/177; 349/180; 349/128
[58] Field of Search .................. 349/132, 177, 349/180, 128, 123

[56] References Cited

U.S. PATENT DOCUMENTS

| 4,239,345 | 12/1980 | Berreman et al. | 349/179 |
| 4,333,708 | 6/1982 | Boyd et al. | |
| 4,601,544 | 7/1986 | Cheng et al. | 349/177 |
| 4,834,500 | 5/1989 | Hilsum et al. | 349/199 |
| 5,357,358 | 10/1994 | Durand et al. | 349/177 |
| 5,384,650 | 1/1995 | TeKolste et al. | 349/130 |

FOREIGN PATENT DOCUMENTS

| WO A 8905993 | 6/1989 | WIPO . |
| WO A 9111747 | 8/1991 | WIPO . |
| WO A9200546 | 1/1992 | WIPO . |
| 92/21046 | 11/1992 | WIPO . |

*Primary Examiner*—Anita Pellman Gross
*Assistant Examiner*—Kenneth Parker
*Attorney, Agent, or Firm*—Nixon & Vanderhye P.C.

[57] ABSTRACT

A nematic liquid crystal device with two bistable switched states, having two cell walls treated which provide a bigrating on one or both cell walls. The bigrating enables the liquid crystal molecules at a surface to lie in two different angular directions, 45 or 90 degrees apart. The bigrating may be symmetric or asymmetric, with the surface energy of each of the gratings of the bigratings being nearly equal.

14 Claims, 5 Drawing Sheets

TOP SURFACE

BOTTOM SURFACE

BISTABLE NEMATIC LIQUID CRYSTAL DEVICE WITH BIGRATING ALIGNMENT LAYERS AND TWIST

BACKGROUND OF THE INVENTION

1. Field of the Invention

This invention relates to bistable nematic liquid crystal devices.

2. Discussion of Prior Art

Liquid crystal devices typically comprise a thin layer of a liquid crystal material contained between cell walls. Optically transparent electrode structures on the walls allow an electric field to be applied across the layer causing a re-ordering of the liquid crystal molecules.

There are three known types of liquid crystal material, nematic, cholesteric, and smectic each having a different molecular ordering. The present invention concerns devices using nematic materials.

In order to provide displays with a large number of addressable elements it is common to make the electrodes as a series of row electrode on one wall and a series of column electrodes on the other cell wall. These form eg an x,y matrix of addressable elements or pixels and, for twisted nematic types of devices, are commonly addressed using rms addressing methods.

Twisted nematic and phase change type of liquid crystal devices are switched to an ON state by application of a suitable voltage, and allowed to switch to an OFF state when the applied voltage falls below a lower voltage level, ie these devices are monostable. For a twisted nematic type of device (90° or 270° degree twist as in U.S. Pat. No. 4,596,466), the number of elements that can be rms addressed is limited by the steepness of a device transmission vs voltage curve as details by Alt and Pleschko in IEEE Trans ED vol ED 21 1974 pages 146–155. One way of improving the number of pixels is to incorporate thin film transistors adjacent each pixel; such displays are termed active matrix displays. An advantage of nematic type of devices is the relatively low voltage requirements. They are also mechanically stable and have wide temperature operating ranges. This allows construction of small and portable battery powered displays.

Another way of addressing large displays is to use a bistable liquid crystal device. Ferroelectric liquid crystal displays can be made into bistable device with the use of smectic liquid crystal materials and suitable cell wall surface alignment treatment. Such a device is a surface stabilised ferroelectric liquid crystal device (SSFELCDs) as described by: —L J Yu, H Lee, C S Bak and M M Labes, Pys Rev Lett 36, 7, 388 (1976); R B Meyer, Mol Cryst Liq Cryst, 40, 33 (1977); N A Clark and S T Lagerwall, Appl Phys Lett, 36, 11, 899 (1980). One disadvantage of ferroelectric devices is the relatively large voltage needed to switch the material. This high voltage makes small portable, battery powered displays expensive. Also these displays suffer from other problems such as lack of shock resistance, limited temperature range and also electrically induced defects such as needles.

If bistable surface anchoring can be achieved using nematics then a display can be made which has the merits of both the above mentioned technologies but none of the problems.

It has already been shown by Durand et al that a nematic can be switched between two alignment states via the use of chiral ions or flexoelectric coupling; A Gharbi, R Barberi, G Durand and P Martinot-Largarde, Patent Application No WO 91/11747, (1991) "Bistable electrochirally controlled liquid crystal optical device", G. Durand, R Barberi, M Giocondo, P Martinot-Largarde, Patent Application No WO 92/00546 (1991) "Nematic liquid crystal display with surface bistability controlled by a flexoelectric effect". These are summarised as follows:

In Patent Application No WO 91/11747 a device is described with the following characteristics:

1. The cell is made using two surfaces which have SiO coatings of appropriate thickness and evaporation angle to allow two stable states to exist on each surface. Furthermore the two states on a surface are designed to differ in azimuthal angle by 45° and the surfaces are oriented such that each of the two resulting domains are untwisted.

2. The cell (of 6 μm thickness) is filled with 5 CB doped with 0.5% benzyl quininium bromide and 1.8% phenyl lactic acid. The former is an electrically positive chiral ion with left hand twist while the latter is a negative chiral ion with a right hand twist. The concentrations ensure that the final mixture has a very long pitch so that the states in the thin cell are uniform.

3. Application of a 110V dc pulse for 40 μs enabled switching between the two states. A lower threshold is observed for longer pulse eg an 80V threshold is observed for 300 μs pulses.

4. Addition of suitable oriented polarisers caused one state to appear black while the other appears white with a contrast ratio of about 20.

5. A variant device is also mentioned which uses a short pitch chiral ion mixture between monostable surfaces which possess different zenithal anchoring energies. Switching between a 180° twisted state and a uniform state is observed in a 4 μm cell for pulses over 50V.

In Patent Application WO 92/00546 a device is described with the following characteristics:

The cell is made using two surfaces which have SiO coatings of appropriate thickness and evaporation angle to allow two stable states to exist on each surface. Furthermore the two states on a surface are designed to differ in azimuthal angle by 45° and the surfaces are oriented such that each of the two resulting domains are untwisted.

The surfaces are also oriented in such a way that the pretilted state on one surface lines up with the untilted state on the other surface and vice versa. Hence when filled with 5 CB, the two states are seen as shown in FIG. 7B and 7C.

Application of a 14V dc pulse across a 1 μm cell for 100 μs allows switching between the states. The final state is dependent on the sign of the pulse due to its coupling to the flexoelectric polarisation. The same voltage threshold is observed for switching in both directions.

The surface used by Durand to obtain bistable alignment was a thin layer of SiO evaporated at a precise oblique angle. However this method suffers the disadvantage that any deviation in the evaporation angle, layer thickness or indeed any of the deposition parameters is likely to produce a surface with only monostable alignment. This makes the oblique evaporation technique unsuitable, or very difficult, for large area displays.

Another bistable nematic device is described in U.S. Pat. No. 4,333,708.

SUMMARY OF THE INVENTION

According to this invention the above disadvantages are overcome by the use of accurately formed gratings on cell walls; such gratings permit nematic liquid crystal molecules to adopt either of two uniform alignment directions. These two alignment directions may be switched electrically to form displays.

According to this invention a bistable nematic liquid crystal device comprises two walls enclosing a layer of liquid crystal material;

electrode structures on both wall;

a surface alignment on both cell walls providing alignment direction to liquid crystal molecules;

means for distinguishing between switched states of the liquid crystal material.

CHARACTERISED BY a surface alignment bigrating on at least one cell wall that permits liquid crystal molecules to adopt two different angular aligned directions when suitable electrical signals are applied to the electrodes.

The angle between the two alignment directions may be varied and depends upon the shape of the bigrating.

The bigrating may be a profiled layer of photopolymer formed by a photolithographic process; eg M C Hutley, Diffraction Gratings (Academic Press, London 1982) p95–125; and F Horn, Physics World, 33 (March 1993). Alternatively, the bigrating may be formed by embossing; M T Gale, J Kane and K Knop, J Appl Photo Eng, 4, 2, 41 (1978), or ruling; E G Loewen and R S Wiley, Proc SPIE, 815, 88 (1987), or by transfer from a carrier layer.

One or both cell walls may be formed of a relatively thick non flexible material such as a glass, or one or both cells walls may be formed of a flexible material such as a thin layer of glass or a plastic material eg polypropylene. A plastic cell wall may be embossed on its inner surface to provide a grating. Additionally, the embossing may provide small pillars (eg of 1–3 μm height and 5–50 μm or more width) for assisting in correct spacing apart of the cell walls and also for a barrier to liquid crystal material flow when the cell is flexed. Alternatively the pillars may be formed by the material of the alignment layers.

The bigrating may be symmetric or asymmetric; in the later case this results in both surface alignment and a surface tilt. Two bigratings may be arranged so that a high surface tilt on one wall is opposite a low surface tilt on the other cell wall so that liquid crystal molecules adopt a splayed configuration is both switched states.

A bigrating surface may be described as a surface satisfying:

$$\Psi(x,y) = \Psi(x+mk_x, y+nk_y)$$

where m and n are integers while $k_x$ and $k_y$ are periodicities and $\Psi$ is a function describing the surface amplitude.

Consider a simple theoretical description of the surface energy of a bigrating. The grating surface is described by $$A = a\sin\frac{2\pi}{L_1} x + b\sin\frac{2\pi}{L_2} y$$

where a, b are constants. $L_1$, $L_2$ are pitches of the two gratings.

Let a nematic be in contact with this surface such that its director field is given by:

$$n = (\cos\theta\cos\phi, \cos\theta\sin\phi, \sin\theta)$$

ie $\theta$ is the zenithal angle and $\phi$ the azimuthal.

Let $\theta=0$ (x,y,z) but assume $\phi$ to be a constant.

Taking the director to lie tangential to the grating surface and the undulations to be shallow (a, b<<$L_1$, $L_2$) then $$\theta(z=0) = a\frac{2\pi}{L_1} \cos\phi\cos\frac{2\pi}{L_1} x + b\frac{2\pi}{L_2} \sin\phi\cos\frac{2\pi}{L_2} y$$

and away from the grating surface $$\theta = e^{(-\kappa z)}\theta$$

Assuming the splay and bend elastic constants to be equal to each other, $K_{11}=K_{33}$, but different from the twist constant, $K_{22}$; then the elastic free energy density is given by $$\frac{2W_d}{K_{33}} = \theta_x^2(l\sin^2\phi + \cos^2\phi) + \theta_y^2(l\cos^2\phi + \sin^2\phi) +$$

$$\theta_z^2 + \theta_x\theta_y(l - 1)2\sin\phi\cos\phi$$

where $L=K_{22}/K_{33}$ and 0 is the derivative of 0 with respect to x, and similary for $0_y$ and $0_x$.

The Euler-Lanrange equation is then $$\theta_{xx}(1\sin^2\phi+\cos^2\phi)+\theta_{yy}(1\cos^2\phi+\sin^2\phi)+\theta_{zz}+(l-1)\sin 2\phi\theta_{xy}=0$$

The solution satisfying the earlier boundary conditions is $$\theta = a\frac{2\pi}{L_1} \cos\phi\cos\frac{2\pi}{L_1} x\exp\left\{ -\sqrt{(l\sin^2\phi + \cos^2\phi)} \frac{2\pi}{L_1} z \right\} +$$

$$b\frac{2\pi}{L_2} \sin\phi\cos\frac{2\pi}{L_2} y\exp\left\{ -\sqrt{(l\cos^2\phi + \sin^2\phi)} \frac{2\pi}{L_2} z \right\}$$

Defining $$A = b^2\left(\frac{2\pi}{L_2}\right)^3 a^{-2}\left(\frac{2\pi}{L_1}\right)^{-3}$$

ie A is the relative energy of the two orthogonal gratings, then the surface energy per unit area, $F_d$, follows $$F_d =$$

$$\frac{\sqrt{(K_{33}K_{22})}}{4} a^2\left(\frac{2\pi}{L_1}\right)^3 \left\{ \sqrt{\left(1+\left(\frac{K_{33}}{K_{22}} - 1\right)\cos^2\phi\right)} \cos^2\phi + \right.$$

$$\left. A\sqrt{\left(1+\left(\frac{K_{33}}{K_{22}} - 1\right)\sin^2\phi\right)} \sin^2\phi \right\}.$$

For gratings of equal pitch ie $L_1=L_2$ $$A=(a/b)^2$$

The bigrating has a profile having 0.5<A<2.0, preferrably 0.8<A<1.2, typically 0.9<A<1.1. A typical symmetric, sinusoidal grating may have a pitch of 0.8 μm and an amplitude (half peak to peak) of 0.1 μm. An asymmetric grating may have a similar pitch and amplitude but may be of approximate sawtooth shape.

An asymmetric or blazed bigrating may be defined as a surface for which there does not exist a value of h such that:

$$\Psi_x(h-x)=\Psi_x(h+x)$$

for all values of x, where $\Psi$ is the function describing the surface. A similar expression can be written if the blaze is along the y direction. In the case of a sine/blaze bigrating each bistable state possesses the same pretilt. However the symmetry can be further reduced by employing a blaze/blaze bigrating ie one in which the modulations in both the principle directions are asymmetric, eg the gratings are sawtooth in section. In this case it is found that one of the bistable states is pretilted while the other has zero pretilt.

The device may further include means for applying addressing voltages to the electrodes whereby the device may be switched into two different alignment states for displaying information.

The liquid crystal material may include chiral ions so that the device may be switched by application of a large ac voltage followed by application of a suitable unidirectional voltage pulse.

The liquid crystal material may have a suitable high flexoelectric value so that the device may be electrically switched by application of a pulse of appropriate polarity.

The cell may be arranged between two coloured or neutral polarisers, both with or without a small amount of a pleochroic dye (eg D 82 Merck) in the liquid crystal material. The polarisation axis of the polarisers, the layer thickness, and the material birefringence may be arranged to optimise display contrast between ON and OFF states. For example the polarisers optical axis may be up to a few degrees away from being parallel or perpendicular to an adjacent alignment direction.

BRIEF DESCRIPTION OF THE DRAWINGS

The invention will now be described, by way of example only, with reference to the accompanying drawings in which.

DETAILED DISCUSSION OF PREFERRED EMBODIMENTS

Figure 1:
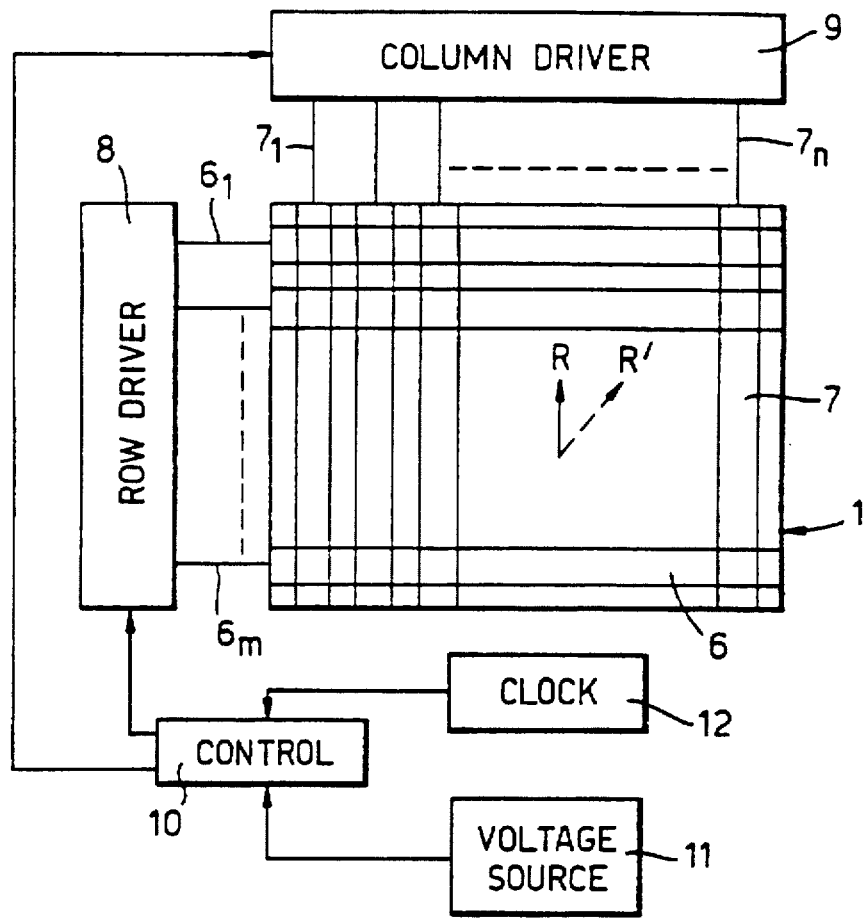
FIG. 1 is a plan view of a matrix multiplex addressed liquid crystal display.
Figure 2:
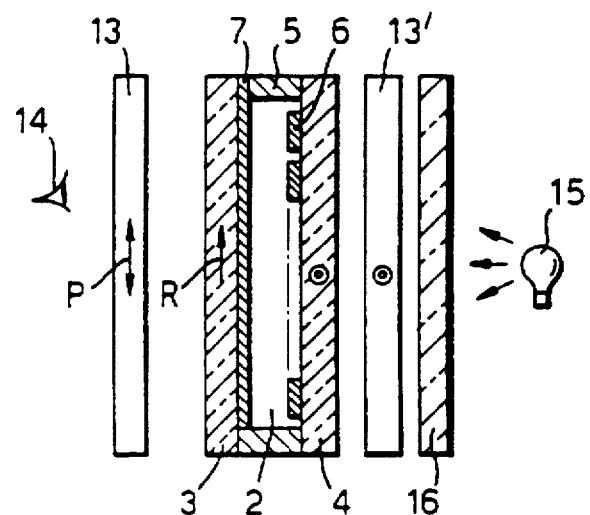
FIG. 2 is a cross section of the display of FIG. 1.

The display of FIGS. 1, 2 comprises a liquid crystal cell 1 formed by a layer 2 of cholesteric liquid crystal material contained between glass walls 3, 4. A spacer ring 5 maintains the walls typically 2 µm apart. Additionally numerous polymer spacer beads of 2 µm diameter may be dispersed in the liquid crystal material to maintain an accurate wall spacing. Strip like row electrodes 6 eg of SnO2 are formed on one wall 3 and simular column electrodes 7 formed on the other wall 4. With m-row and n-column electrodes this forms an m.n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages if from a control logic 10 which receives power from a voltage source 11 and timing from a clock 12.

Either side of the cell 1 are polarisers 13, 13'. For devices where both cell walls 3, 4 have bigrating alignment and the two alignment directions are at 45° to one another, then the polarisers are arranged with their polarisation axis crossed with respect to one another with the axis of one polariser parallel to one of the two alignment directions on an adjacent wall 3 or 4. For devices having a bigrating on one wall 3, and a monograting (eg a rubbed alignment) on the other wall 4, then the polariser 13' has its axis parallel to the monograting alignment on wall 4 and the polariser 13 has its axis parallel to one of the two alignment directions on the wall 3.

A partly reflecting mirror 16 may be arranged behind the cell 1 together with a light source 15. These allow the display to be seen in reflection and lit form behind in dull ambient lighting. For a transmission device, the mirror may be omitted.

Prior to assembly the cell of FIGS. 1, 2 at least one cell wall is surface treated to provide a bigrating; the other wall may have either a bigrating or a monograting or a conventional eg rubbing alignment treatment. Apparatus for producing this bigrating is shown in FIG. 4.

Figure 4:
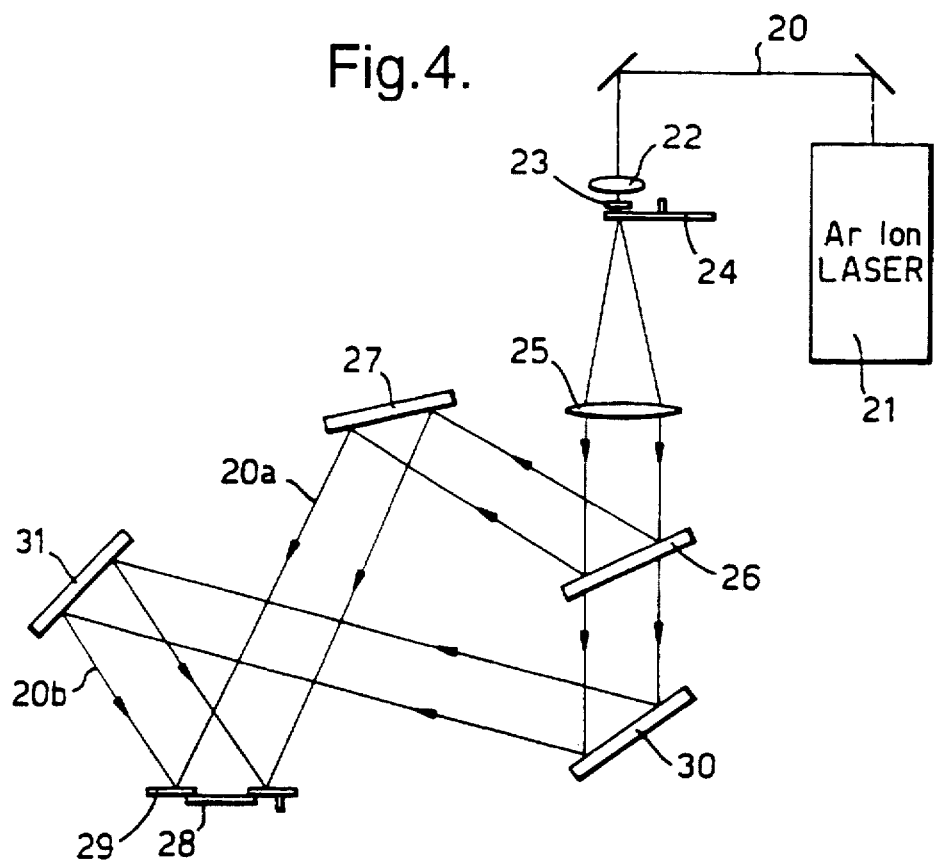
FIG. 4 is a diagrammatic view of apparatus for producing symmetric bigrating surfaces of a cell wall.

As shown in FIG. 4 light 20 from an argon ion laser 21 is focused by a first lens 22 onto a fixed first diffuser 23 and a rotating second 24 diffuser. A second lens 25 recollimates the now expanded laser beam onto a semi aluminised beamsplitter 26. Light is reflected from the beamsplitter 26 onto a first mirror 27 and thence onto a substrate 28 supported in a holder 29. Light transmitted through the beam splitter 26 is reflected off a second mirror 30 and a third mirror 31 onto the substrate. Thus the substrate 28 receives two beams 20a, 20b which sets up a stationary fringe pattern. The pitch of the fringe pattern depends upon the angle between the two beams 20a, 20b coming from the first and second mirrors 27, 31.

A sinusoidal bigrating may be produced by the apparatus of FIG. 4 as follows:

EXAMPLE 1

A piece of ITO coated glass 28 to form a cell wall was cleaned in acetone and isopropanol and was then spin coated with a photopolyimide (Nissan RN901) at 4000 rpm for 20 seconds to give a coating thickness of 1.2 µm. Softbaking was then carried out at 80° C. for 30 minutes. The sample 29 was then exposed to an interference pattern of light generated from the argon ion laser 21 (wavelength of 457.9 nm) as shown in FIG. 4.

The sample 28 was given a 90 second exposure at a power density of 1.5 mW/cm². A second exposure also of 90 seconds duration was then carried out after the sample 28 had been removed from the holder 29, rotated by 90° and replaced. Development was then carried out by a 60 second immersion in microposit MF319 developer followed by a 30 second rinse in deionised water. Finally the photopolyimide was crossed linked by a 60 minute bake at 170° C. followed by a 30 minute bake at 350° C. In this case the resulting sample contained a surface relief bigrating in which the two principle modulations were at 90° to each other. However it may be advantageous for particular applications if the modulations were at less than 90° to each other, eg 45°.

The dimensions of the bigrating are critical; outside a relatively narrow range of values the grating will not provide a two directional alignment.

Figure 5:
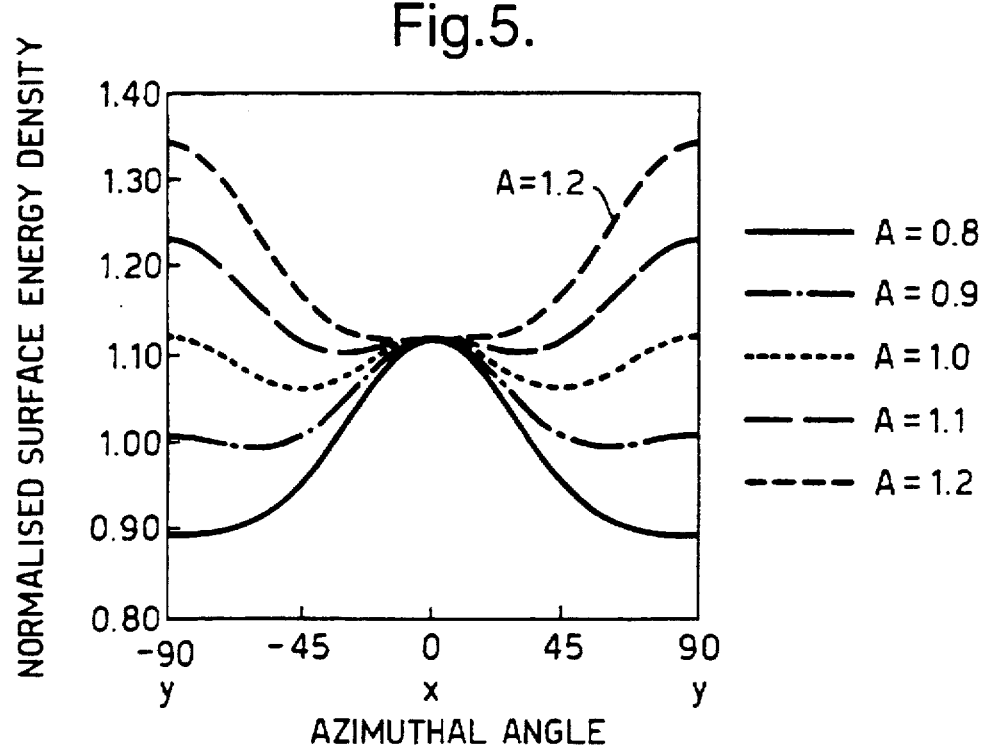
FIG. 5 is a theoretical graph of surface energy density as a function of azimuthal angle.

This is explained by reference to FIG. 5 which shows a theoretical plot of the surface energy density at the liquid crystal/grating interface as a function of the azimuthal orientation of the nematic director at that interface. Several curves are plotted for different values of $A(=(a/b)^-)$ and in each case the predicted nematic orientation on the surface is located at the function minima. In this modelling the liquid crystal material constant $k_{33}/k_{22}$ is set to 1.25 which is reasonable for a typical nematic. For A=0.8 there exists two degenerate minima at +/−90°, ie the nematic director lies along the y direction. Similarly when A=1.2, the nematic director lies along the x direction; both x and y are axes in the plane of the grating surface. However when the groove depths in the two principle directions are of similar amplitudes (A close to 1) there exists two stable states at angles intermediate to the groove directions. For A<0.9 or A>1.1 this bistability is lost and so the theory suggests that groove depth control to less than 5% is required. This constraint is not a problem for photolithographic or interferographic grating manufacture.

Hence for the above example bistability requires an accurate energy balance between two directions which is easy to achieve with gratings but is very hard to achieve via oblique evaporation; ie 0.9<A<1.1.

EXAMPLE 2

Using two cell walls having bigratings produced as in Example 1 with A=1.0, a 10 µm thick layer of nematic material in a cell was constructed so that the grooves on one cell wall were in the same directions as the grooves on the other. This cell was filled with a nematic liquid crystal E7 (a Merck material). Microscopic observation revealed two uniform alignment directions at +/−45° to the groove directions in agreement with theory. Roughly equal areas of each state were seen. Either of the two stages could be favoured by temperature cycling in a magnetic field. For example the cell was heated into the isotropic phase of E7 and then cooled in a magnetic field of 2.0 T directed along the +45° direction. This lead to only one state in which the director pointed along the +45° direction. Similarly cooling in a field along the −45° direction favoured the −45° state. Finally cooling in no field returned the cell to a random structure in which both states share the cell area. This particular configuration could also be switched by doping the nematic with chiral ions using the method of Durand.

EXAMPLE 3

A sinsusoidal bigrating may also be made by the following method. A piece of ITO coated glass 28 to form a cell wall was cleaned in acetone and isopropanol and was then spin coated with a photo-resist (Shipley 1805) at 4000 rpm for 30 seconds to give a coating thickness of 0.5 µm. Softbaking was then carried out at 90° C. for 30 minutes. The sample 29 was then exposed through a contact photolithographic mask containing a bigrating of 1.5 µm by 1.5 µm pitch to light from a mercury lamp.

Exposure was carried out for 25 seconds at 1.5 mW/cm² followed by 10 seconds developing in MF319. Cells were constructed after a 10 hour hard bake at 105° C. Liquid crystal material thickness was 5 µm. Switching behaviour was found to be the same as Example 2.

For a cell constructed with a bigrating on one cell wall and a monograting (eg a rubbed alignment treatment), then two twisted states are observed in which the liquid crystal material director follows the groove direction on the monograting surface and lies at an intermediate angle to the groove directions on the bigrating surface. This assumes that the anchoring strength of the grating of the same order of magnitude as the elastic constants of the liquid crystal. This configuration could also be switched with chiral ions.

It has been found that pretilt can be added to the bistable states by fabricating a bigrating which is blazed (asymmetric) along one of its principle groove directions. This may be carried out using a modified interferometer as described in N K Sheridon, Appl Phys Lett, 12, 316 (1968).

Figure 8:
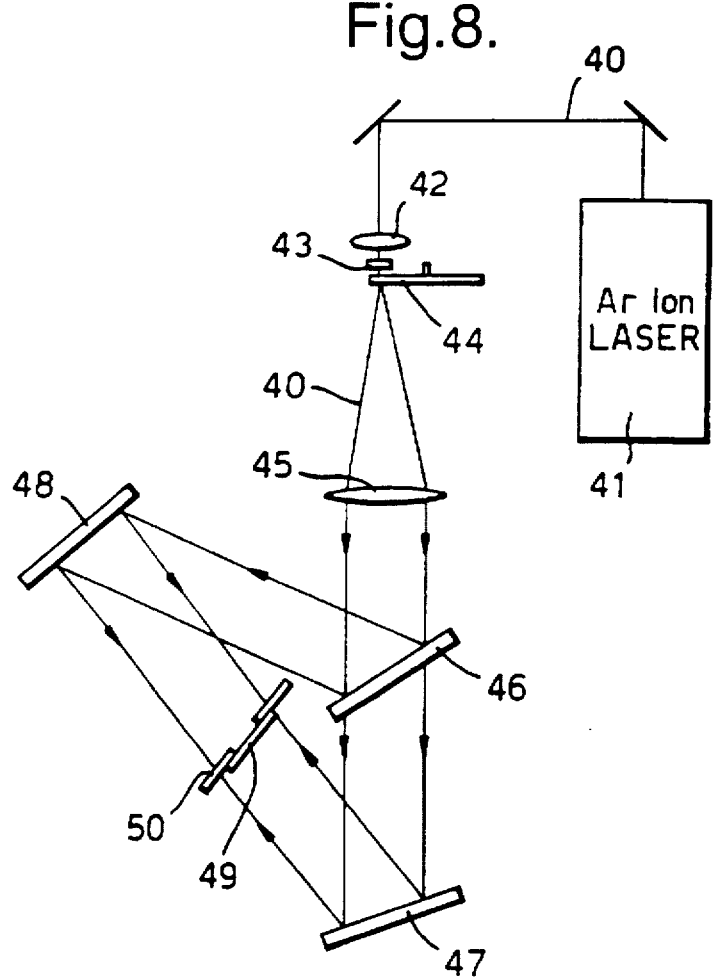
FIG. 8 is diagrammatic views of apparatus for producing asymmetric (blazed) gratings.

FIG. 8 shows apparatus for producing a blazed grating. As shown light 40 from an argon ion laser 41 (of wavelength 457.9 nm) is focused by a first lens 42 onto a fixed diffuser 43 and a rotating diffuser 44. A second lens 45 recollimates the now expanded laser beam 40 which is then amplitude split by a semi aluminised beamsplitter 46 onto two mirrors 47, 48. A substrate 49 to be formed into a grating is mounted in a sample holder 50 located between the two mirrors 47, 48. The counterpropagating beams in between the two mirrors 47, 48 set up an optical standing wave, ie interference fringes, having a period of half the laser wavelength.

Prior to being mounted in the sample holder 50 a substrate 49 of indium tin oxide (ITO) coated glass is cleaned in acetone and isopropanol and then spin coated with a photopolyimide (Ciba Geigy 343) at 4000 rpm for 30 seconds to give a coating 41 thickness of 3.5 µm. Softbaking is carried out at 80° C. for 15 minutes followed by a further 15 minutes at 100° C. The substrate 49 is then mounted in the sample holder 50 as in FIG. 4 and exposed at an oblique angle to a standing wave pattern of light from the argon ion laser 41. This is a specific example of interferographic grating manufacture, M C Hutley, Diffraction Gratings (Acedemic Press, London 1982) pp 95–125.

Figure 9:
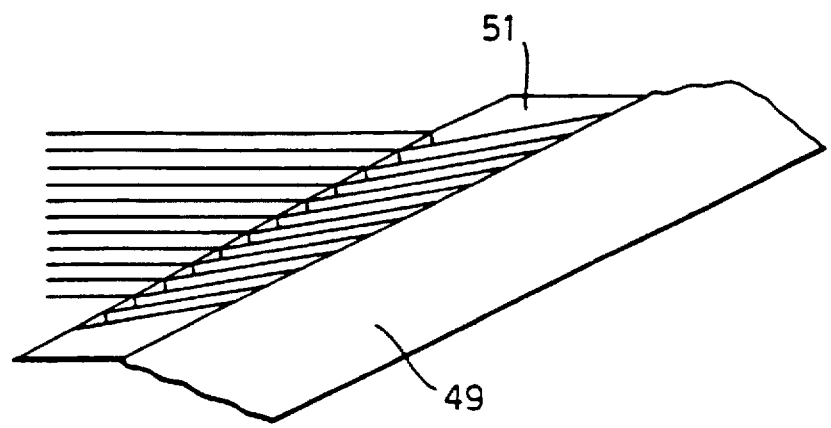
FIG. 9 is a section of a cell wall being treated by the apparatus of FIG. 8.

The interference fringes are recorded into the photopolymer layer 51 as shown in FIG. 9. The pitch of the grating depends on the angle between the substrate 49 and the standing wave. Typical exposure is 300 seconds with a power density at the sample of 1.5 mW/cm². After a post exposure bake (105° C., 5 minutes) the sample is spin developed for 15 seconds in QZ3301 (Ciba Geigy) and then rinsed in QZ3312 for 15 seconds.

Figure 6A:
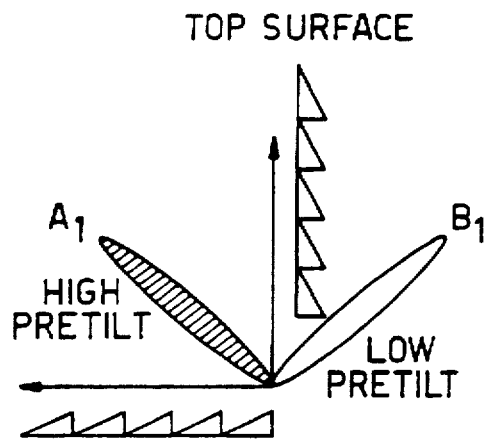
FIGS 6a, b are diagrams showing direction of alignment and amount of tilt of cell walls.
Figure 6B:
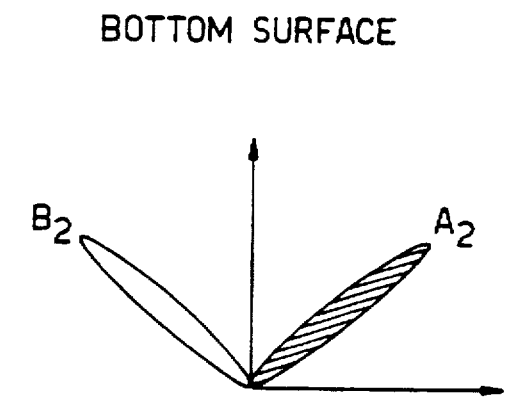
Figure 7A:
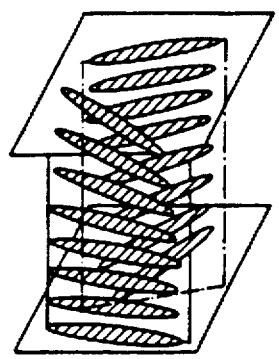
FIGS. 7a, b, c are diagrams showing two oppositely splayed states.

The use of two blazed gratings giving zero pretilt in one bistable state is explained by reference to FIGS. 6a, b. FIG. 6 represents the top surface (shown face down) of a cell. The blaze directions is represented by arrows and in practice these directions could correspond to the long facets of a sawtooth modulation (shown in section along each of the principle grating directions). The symmetry of the surface then dictates that the state lying in the quadrant between the blaze directions $A_1$ will be pretilted while the other state $B_1$ is non tilted (if the two principle modulations have different amplitudes or different amounts of asymmetry then both states will be pretilted but by different amounts). FIG. 6b shows the bottom cell wall shown face up, with blaze direction indicated by arrows. If this top surface, FIG. 6a, (shown face down) is constructed in the shown orientation with the bottom surface, FIG. 6b, (shown face up) then two liquid crystal states are obtained; $A_1B_2$ and $B_1A_2$ as shown in FIGS. 7a, b, c. These splayed configurations are important as the two states have opposite sign of splay and so dc coupling to the flexoelectric polarisation (shown as p) by a field applied between electrodes on the cell walls allows switching between the states in a similar manner to that described in Patent Application No WO 92/00546 described above.

Figure 3:
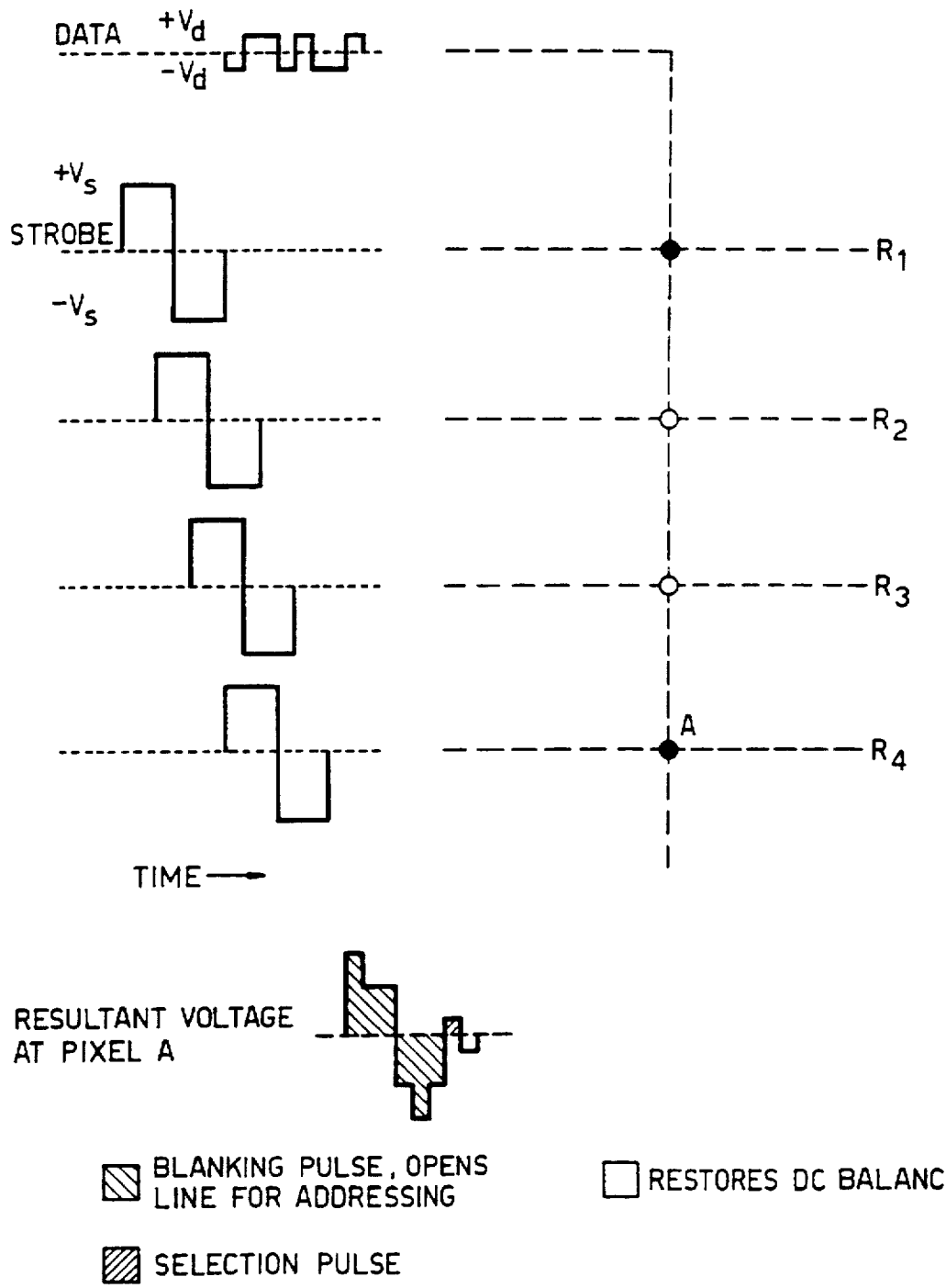
FIG. 3 is a set of waveform diagrams showing four rows and one column. The resultant voltage as a function of time per one pixel is given.

A display using a cell similar to the above cell, but with an angle of 45° between two bigrating induced, liquid crystal alignment directions, may be addressed with voltages as shown in FIG. 3.

As shown pixels in four consecutive rows R1, R2, R3, R4 in one column are to be switched. Two possible alignment directions may be arbitrarily defined as ON and OFF states. Rows R1, R4 are to be switched to an ON state, rows R2, R3 are in the OFF state.

Strobe pulses of +Vs for three time periods ts followed by −Vs for 3 ts are applied to reach row in turn as shown. A data waveform is applied to the column as shown and comprises a −Vd for 1 ts followed by a +Vd for 1 ts for an ON pixel, and −Vd for 1 ts followed by +Vd for 1 ts for an OFF pixel.

Resultant voltages are large voltages first of positive then negative potential. These align the nematic liquid crystal material molecules (more correctly the director) normal to the cell walls, ie the homeostropic condition. These are followed by the small selection pulse eg of positive potential to switch to an ON state. This small positive pulse is sufficient to cause chiral rows in the liquid crystal material to move to one cell wall and favour switching to the ON state alignment direction as the liquid crystal molecules relax back to a homogeneous state in the absence of an applied voltage. The following small negative potential pulse provides dc balance and is of insufficient magnetude to cause further switching.

In one switched state all molecules align along the optical axis of one polariser 13. Since the optical axes of the polarisers 13, 13' are crossed polarised light from polariser 13 passes through the cell to be blocked by the other polariser 13'; thus minimal light is transmitted through the device. When the cell is switched so that all molecules align in one direction at 45° to a polariser 13, 13' then maximum light is transmitted through the cell due to liquid crystal birefringence and relative positioning of the polarisers 13, 13'.

Figure 7B:
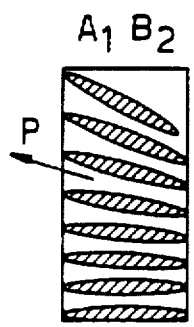
Figure 7C:
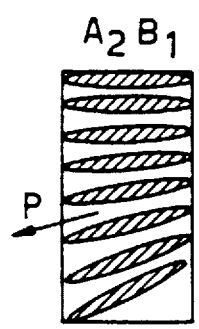

Similarly, for a nematic with a usefully large flexoelectric constant, eg about $10^{-4}$ cgs or more, then the nematic may be switched between the two splayed states described with reference to FIG. 7.

Note that in both the switched states of a cell with two bigratings, the nematic liquid crystal material has no twist across the layer; this contrasts with twisted nematic devices where typically the material has a 90° twist. For cells with a monograting on one cell wall and a bigrating on the other wall there will be an amount of twist in both switched states eg +45° & −45°.

Gratings in the above examples had a pitch of 0.8 μm, however a wide range of pitches can be used. The arrangement in FIG. 4 can make any pitch of grating greater than 0.25 μm but smaller pitches could be made with ultraviolet lasers. The azimuthal alignment energy per unit area for a single sinusoidal grating has been calculated (D W Berreman, Phys Rev Lett, 28, 1683 (1972)) as $U=2\pi^3 K_{11} (a^2/L^3)$ where a is the grating amplitude (half the peak to trough grooves depth) and L is the pitch. In terms of liquid crystal alignment, a useful grating must have a profile such that U is greater than the thermal randomisation energy and greater than the energy associated with any other surface irregularity or material inhomogeneity. Further, small pitches are preferred to obtain sufficient energy because if a is too large then a large voltage drop will occur across the grating when a field is applied to the cell.

Efficient bistable switching also requires the anchoring to be broken at the surface. The voltage required to do this is dependent on the zenithal anchoring energy of the polymer forming the grating. Careful choice of this polymer material or processing allows this voltage to be minimised. Alternatively or additionally the grating may be coated with a surfacent such as lecithin.

We claim:

1. A bistable nematic liquid crystal device comprising
   two cell walls enclosing a layer of liquid crystal material, said liquid crystal material having elastic and twist constants;
   electrode structures on both walls;
   a surface alignment on both cell walls providing alignment direction to said liquid crystal material; and
   means for distinguishing between switched states of the liquid crystal material, wherein said surface alignment comprises a bigrating on at least one cell wall, said bigrating having at least two gratings, said at least two gratings having a grating dimension, the grating dimensions of said at least two gratings, in combination with said elastic and twist constants, permitting said liquid crystal material to adopt two different angular aligned directions when suitable electrical signals are applied to the electrodes.

2. The device of claim 1 wherein each bigrating has a profile in which 0.8<A<1.2 where A is the surface energy ratio of interactions between the liquid crystal material and each of the at least two gratings of the bigrating.

3. The device of claim 1 wherein both cell walls carry bigrating surfaces and the two alignment directions on both cells walls are in register with one another.

4. The device of claim 1 wherein one cell wall is provided with a bigrating alignment and the outer cell wall is provided with a monstable single alignment direction treatment whose single alignment direction lies between the two permitted alignment directions of the bigrating.

5. The device of claim 1 wherein at least one bigrating has at least one asymmetric grating profile.

6. The device of claim 3 wherein the direction of asymmetric alignment on the cell walls oppose one another in the same direction.

7. The device of claim 5 wherein the direction of asymmetric alignment on the cell walls oppose one another in the opposite direction.

8. The device of claim 1 wherein at least one bigrating has at least one symmetric grating profile.

9. The device of claim 1 wherein the bigrating is a layer formed by interferography, photolithogrphy, embossing, ruling, or carrier transfer.

10. The device of claim 1 wherein the cell walls are formed of a glass material.

11. The device of claim 1 wherein the cell walls are formed of a flexible plastic material.

12. The device of claim 1 wherein spacer pillars are formed on one or both cell walls.

13. The device of claim 1 wherein spacer pillars are formed by the material forming the grating on at least one cell wall.

14. The device of claim 1 wherein each bigrating has a profile in which 0.9<A<1.1 where A is the surface energy ration of interactions between the liquid crystal material and each of the at least two gratings of the bigrating.

* * * * *